(12) United States Patent
Geller

(10) Patent No.: US 8,579,522 B2
(45) Date of Patent: Nov. 12, 2013

(54) CAMERA SCREW

(76) Inventor: Wolfgang-Peter Geller, Garlstorf (DE)

( * ) Notice: Subject to any disclaimer, the term of this patent is extended or adjusted under 35 U.S.C. 154(b) by 318 days.

(21) Appl. No.: 13/011,423

(22) Filed: Jan. 21, 2011

(65) Prior Publication Data

US 2012/0189294 A1 Jul. 26, 2012

(51) Int. Cl.
*G03B 17/00* (2006.01)

(52) U.S. Cl.
USPC .......................................................... 396/420

(58) Field of Classification Search
USPC ............................................... 396/420; 470/3
See application file for complete search history.

(56) References Cited

U.S. PATENT DOCUMENTS

| | | | | |
|---|---|---|---|---|
| 2,190,268 A | * | 2/1940 | Magid | ................................. 59/95 |
| 2,723,430 A | * | 11/1955 | Paillard | ........................... 24/369 |
| 4,188,041 A | * | 2/1980 | Soderberg | ........................ 279/75 |
| 4,396,137 A | | 8/1983 | Benjamin | |
| 5,704,729 A | * | 1/1998 | Carnahan et al. | ........... 403/322.1 |
| 5,738,328 A | * | 4/1998 | O'Farrill | ........................ 248/500 |
| 6,814,212 B1 | * | 11/2004 | Ebersole | ...................... 193/35 R |
| 2009/0005815 A1 | * | 1/2009 | Ely | ................................. 606/246 |
| 2010/0284681 A1 | | 11/2010 | Kope et al. | |

FOREIGN PATENT DOCUMENTS

| | | | |
|---|---|---|---|
| CN | 201539671 | | 8/2010 |
| GB | 680194 | | 10/1952 |
| GB | 2164862 A | * | 4/1986 |
| JP | 2002196412 | | 7/2002 |

* cited by examiner

*Primary Examiner* — Clayton E Laballe
*Assistant Examiner* — Linda B Smith
(74) *Attorney, Agent, or Firm* — Sand & Sebolt

(57) ABSTRACT

The present invention relates to a camera screw and to a system consisting of a camera screw and a carrying strap. Carrying straps with appropriate fastenings on the sides of the camera are known. They have numerous disadvantages that should be avoided by the present invention. The camera screw in accordance with the invention for connecting a carrying strap to a tripod thread of a camera includes a first part and a second part. The first part includes a tripod screw on a first end and a circumferential collar on the second end. The second part surrounds the first part between the collar and the tripod screw in a rotatable manner relative to the first part about an axis of rotation. A friction reducing means is provided between the second part and the collar. The second part includes a fastening for the carrying strap.

31 Claims, 2 Drawing Sheets

CAMERA SCREW

BACKGROUND OF THE INVENTION

1. Technical Field

The present invention relates to a camera screw for connecting a carrying strap to a tripod thread of a camera.

2. Background Information

A camera is customarily carried on a carrying strap. This strap is usually attached once to both sides of the camera so that it extends from the one side of the camera to the other side of the camera. If the camera is carried with the aid of such a carrying strap, for example, in that the carrying strap is placed over a shoulder, it usually hangs on the side next to, in front of or behind the body, so that the back of the camera, that is, the rear wall of the camera, rests on the body of the carrier. Any lens present on the camera usually faces away from the carrier and is slightly inclined downward as a function of the distribution of weight between camera and lens.

It is comparatively difficult from such a position to bring the camera rapidly into a position in which a photo can be taken. Furthermore, the described carrying position, in particular in the case of heavy lenses, is negative in that the lower edge of the rear wall of the camera frequently presses in an uncomfortable manner against the upper body of the carrier and the camera and the lens tend to vigorously swing back and forth during movements.

BRIEF SUMMARY OF THE INVENTION

The invention therefore has the problem of indicating a fastening for the camera for carrying it, with which the above-cited disadvantages should be avoided. In particular, a possibility for fastening a carrying strap on the camera should be indicated that avoids the above-described disadvantages and in particular makes a comfortable carrying possible even in the case of heavy and long lenses as well as a rapid photographing.

This problem is solved by a camera screw in accordance with the present invention as well as by a system consisting of a camera screw and a carrying strap.

The camera screw in accordance with the invention for connecting a carrying strap to the camera is designed in such a manner that the camera screw is suitable for connecting a carrying strap to a tripod thread of a camera. By means of the stop of the carrying strap via the camera screw on the tripod thread of the camera, which thread is located in the bottom of the camera, the camera can be carried in a position deviating from the above-described carrying situation. If the camera is carried with the camera screw in accordance with the invention and with a carrying strap via the tripod thread, a position of the camera is achieved during the wearing of the carrying strap over a shoulder in which position the camera bottom faces obliquely upward. The lens faces obliquely downward. Thus, it is possible to grasp the camera in a simple, reliable and rapid manner and the camera can be brought especially rapidly in front of an eye of the carrier for photographing. Even the carrying is distinctly more comfortable since when the carrying strap is worn over a shoulder the camera comes to hang laterally next to the body of the carrier so that the lens can face to the rear and obliquely downward. As a result of this suspension the camera and the lens swing distinctly less even during walking.

The camera screw in accordance with the invention for connecting a carrying strap to a tripod thread of a camera has a first part and a second part. The first part is provided on a first end with a tripod screw and on a second end with a circumferential collar. The second part is designed in such a manner that it surrounds the first part between the collar and the tripod screw and that the second part is arranged relative to the first part in such a manner that it can rotate around the first part about an axis of rotation. A friction reducing means is provided between the second part and the collar of the first part. The second part has a fastening for the carrying strap.

The fastening for the carrying strap can take place in many ways, during which the carrying strap does not necessarily have to be fixed. It is sufficient if it is guided, for example, through an eyelet, that is, it is fastened in as far as the camera screw can not separate from the carrying strap but the camera screw can be shifted, if necessary, along the carrying strap.

The second part is designed between the collar and the tripod screw, at least in a section that is surrounded by the first part, in a circular symmetrical manner, advantageously with the exception of the fastening for the carrying strap, so that a rotation of the first part and the second part can take place in a simple manner.

"Collar" denotes a circumferential widening of the first part. If the first part is advantageously largely symmetrically designed, a collar can occur, for example, by a simple widening of its diameter. The first part then has, for example, a T shape in cross section.

Numerous means can be considered as friction reducing means that reduce the friction during the rotation of the first part against the second part, especially during the action of forces between the first part and the second part along the axis of rotation.

The arrangement of the invention makes possible a reliable transfer of force when carrying the camera by the arrangement of the collar and the friction reducing means as well as of the surrounding second part. When the camera is carried, the force is generally transferred in the direction of the axis of rotation between the fastening for the carrying strap and the tripod screw. A separation of the second part from the first part under the action of the carrying force is excluded by the collar. The arrangement of the friction reducing means between the collar and the second part makes possible a rotation of the second part even upon the action of a force in the direction of the axis of rotation between the first and the second part. This force presses the second part during carrying against the collar or the friction reducing means present between them. Such an arrangement is distinctly more advantageous compared to an arrangement in which the friction reducing means is arranged radially between the first and the second part. The forces can be better transferred and the sliding of the second part off the first part can be prevented by the collar and the friction reducing means located between them.

The fastening means for the carrying strap is advantageously an eyelet pivotably supported on the second part. The axis of pivoting is arranged vertically on the axis of rotation. Furthermore, the eyelet is advantageously dimensioned in such a manner that the pivoting about the axis of pivoting is not prevented by the collar. As a consequence thereof, the eyelet can be pivoted through an angular range of 180°. This makes possible an especially flexible carrying and movement of the camera, for example, in front of the eye of the observer without great hindrances by the carrying strap or the connection between carrying strap and camera.

The first part advantageously comprises a safety ring between the tripod screw and the second part for preventing a sliding of the second part in the direction of the tripod screw. No forces act in this direction as a rule; however, a sliding off the second part in this direction should also be prevented. Such a sliding could arise, for example, if the camera screw is stored and not used, or if the camera is guided upward with fastened camera screw. However, since as a rule no great forces occur in this direction, a reduction of the occurring friction is not necessary as a rule so that the use of a friction reducing means can be omitted here as a rule. Thus, a simple safety ring can be used here. However, it is of course also possible to select a more complex construction here, for example, also with friction reducing means.

The first part is especially advantageously designed to be rotationally symmetric about the axis of rotation. This makes possible an especially simple manufacture and a compact design. The axis of rotation advantageously coincides with the axis for screwing in the tripod screw. This makes an especially comfortable and simple screwing in of the tripod screw possible. This is the case, since then during the screwing in, for example, the collar can be grasped and with the second part being stationary, the tripod screw can be screwed in by rotating the first part into a tripod thread.

A stop connected to the first part is advantageously provided that limits the screwing in of the tripod screw. As a result, the tripod screw can be introduced in such a manner during the screwing in that the body of the camera presses against the defined stop, thus clamping the tripod screw against rotating out. Tripod screws are constructed as a rule with a limited depth so that given an appropriately long tripod screw even a stop can be eliminated without running the danger that the second part is blocked in its ability to rotate by the screwing in; however, an appropriate stop supplies a more defined and more reliable endpoint of the screwing in. The stop can advantageously be formed by the safety ring that is simultaneously designed to prevent a sliding of the second part in the direction of the tripod screw. As a result thereof, structural components can be saved and a compact structural form can be found.

An elastic element bordering on the stop is advantageously provided on the foot of the tripod screw. By means of such an elastic element a certain tension can be built up between the camera and the tripod screw that can reliably prevent a loosening of the camera screw. Furthermore, scratches and scrapings on the camera body can be avoided.

The friction reducing means is advantageously a roller bearing. Forces can be absorbed in a simple manner by roller bearings and friction reduced.

The friction reducing means is advantageously a ball bearing. Such roller bearings can be manufactured in an especially simple manner and are available in very many designs.

The roller bearing is especially advantageously an axial bearing. In this case the force can be transferred and received especially well. In the described case the axis advantageously runs congruently with the axis of rotational symmetry of the first part. The first part advantageously forms an inner and an outer limitation for the axial bearing. It is also conceivable that one, especially the outer limitation, is formed by the second part; however, the formation of a limitation even on the outer area by the first part offers the advantage that the outer limitation can then be used, for example, as a gripping surface for screwing the tripod screw into a camera housing. This makes an especially compact structural form possible with good maneuverability at the same time.

The first and the second part advantageously have metallic contact surfaces for roller bodies of the roller bearing. In such an embodiment the parts can be formed, for example, completely from metal or can have metallic contact surfaces only on the surfaces over which the roller bodies move. Such metallic contact surfaces increase the service life, in particular under heavy loading. Metallic contact surfaces can also be introduced into the system by encapsulated roller bearings.

The first and the second part advantageously form the bearing boxes of the roller bearing. As a result, no other structural components are required and an economical and compact method of construction can be ensured with reliable operation and a long-time transfer of force at the same time.

It is especially advantageous if the first and the second part also form the inner ring and the outer ring of the roller bearing, thus constituting a lateral limitation. This is particularly advantageous when using ball bearings.

In one embodiment the friction reducing means is manufactured from plastic. This makes an especially economical manufacturing alternative possible that does not have the long service life of a manufacturing alternative with a metallic roller bearing but is, however, distinctly more economical to produce.

In such a case either the first and/or the second part is/are produced as a rule with an integrated friction reducing means completely of plastic or appropriate devices for receiving a friction reducing means of plastic are provided in the first and/or the second part. In this instance this can consist, for example, of a ring of plastic.

The friction reducing means and the first part and/or the friction reducing means and the second part are especially advantageously manufactured from one piece, which lowers the production costs.

The problem is also solved by the one system consisting of a camera screw in accordance with the invention and a carrying strap.

The carrying strap can be, for example, a strap band. Alternatively, any type of carrying belt but in particular those that have a flat cross-sectional surface can be used.

The carrying strap is connected to the fastening for the carrying strap. The carrying strap is advantageously designed to be circumferential and is drawn through the fastening means for the carrying strap before the closing of the circumferential carrying strap so that the camera screw can be advantageously moved along the carrying strap.

BRIEF DESCRIPTION OF THE DRAWINGS

Other advantageous embodiments will be described by way of example and in a purely schematic and non-limiting manner using the following exemplary embodiment.

DETAILED DESCRIPTION OF THE INVENTION

Figure 1:
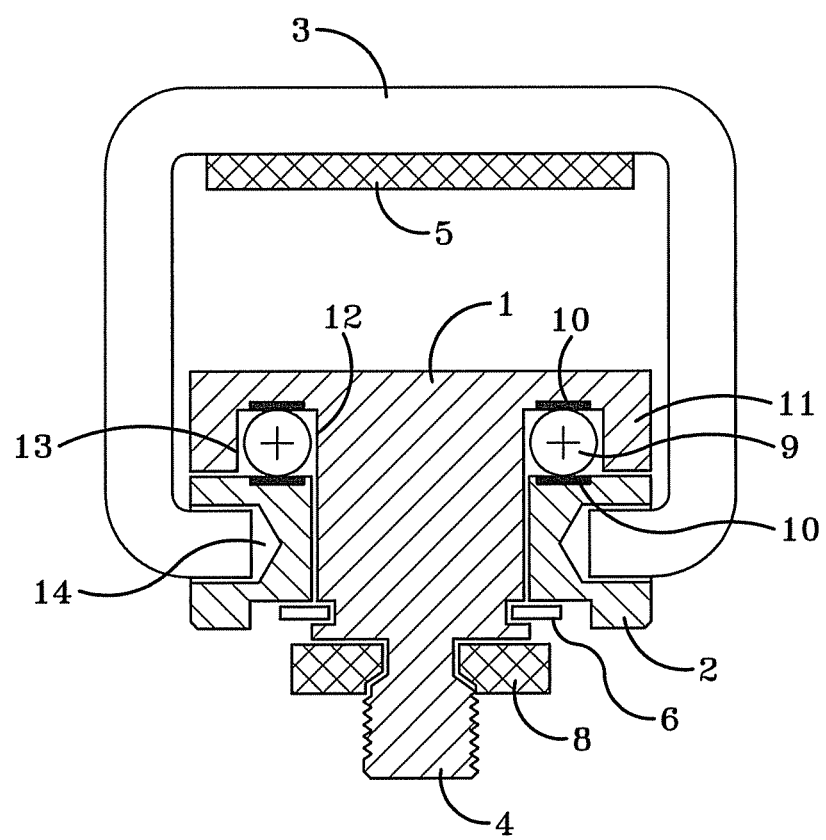
FIG. 1 shows a first embodiment of a camera screw with carrying strap in cross section.

FIG. 1 shows a first embodiment of the camera screw in accordance with the invention with a metallic ball bearing. The first part 1 as well as the second part 2, balls 9, metallic contact surfaces 10, a bracket 3, a tripod screw 4, a rubber disk 8 as well as a spring ring 6 can be recognized. First part 1 is designed to be rotationally symmetric and T-shaped in cross section. It is surrounded by second part 2 which is also designed to be rotationally symmetric. Second part 2 is supported in such a manner that it can rotate about first part 1. A ball bearing is provided between first part 1 and second part 2 for reducing the friction. The ball bearing is formed by metallic contact surfaces 10 that are provided in first part 1 and in second part 2, as well as balls 9. The bearing is laterally closed by an outer limitation of ball bearing 13 and an inner limitation of ball bearing 12. These limitations 12, 13 are formed by first part 1. First part 1 has a collar 11 for support on bearings 9 and for forming the outer limitation of ball bearing 13.

The second part 2 comprises bracket receptacles 14 formed by simple blind holes in second part 2. Bracket 3, through which a carrying strap 5 runs, is received in them.

Spring ring 6 is supported in a notch of first part 1 and prevents a sliding of second part 2. Furthermore, first part 1 comprises a tripod screw 4 formed on first part 1. A rubber disk 8 is arranged on the foot of tripod screw 4.

The camera screw is assembled in that at first balls 9 are placed on first part 1 with contact surface 10. Subsequently, second part 2 is pushed on and the construction secured by spring ring 6. Then, rubber disk 8 is pushed over tripod screw 4. Then, bracket 3 is guided over carrying strap 5 and subsequently introduced into bracket receptacles 14.

During use, first part 1 can be screwed with its tripod screw 4 by rotation on collar 11 into a camera housing or into its tripod thread. The system consisting of carrying strap, camera screw and camera can then be carried on carrying strap 5. During this time the force of the weight of the camera acts on the system. It is transferred from tripod screw 4 via first part 1 and balls 9 onto second part 2. It is further transferred via bracket 3 onto carrying strap 5.

The forces are optimally transferred by the selection of an axial bearing. If a radial bearing had been selected, the forces would have acted into the bearing as shearing forces and a distinctly suboptimal transfer of force would have been selected. This would result in a shorter service life of the camera screw and a greater friction in the first and the second part. Moreover, the danger of a tilting of the bearing would be given.

Figure 2:
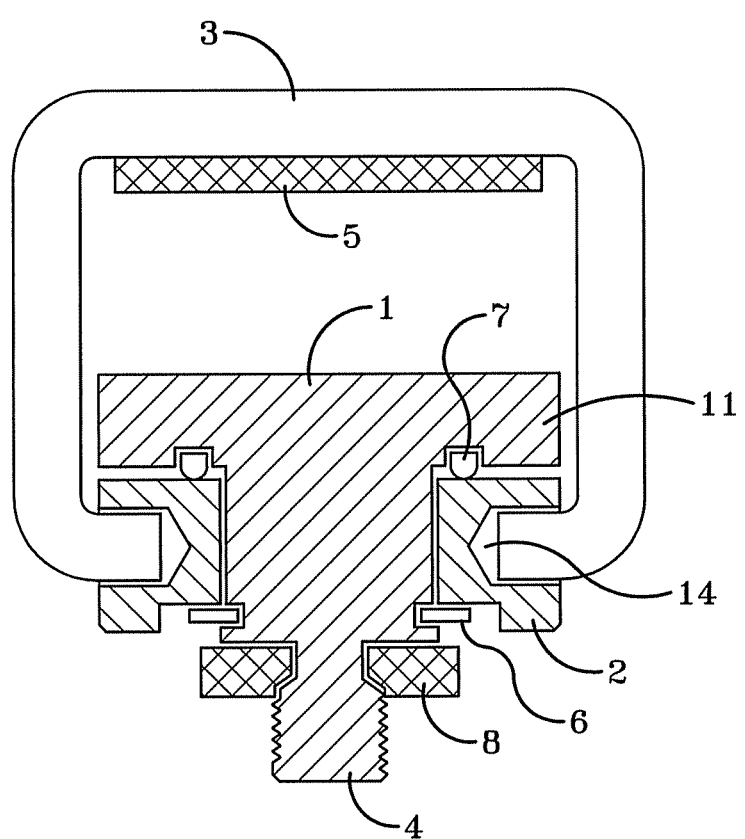
FIG. 2 shows a second embodiment of the camera screw in accordance with the invention with the carrying strap in cross section.

FIG. 2 shows an alternative and more economical embodiment in which instead of a ball bearing a friction reducing means of plastic is used. The first part 1 that is also designed in a rotationally symmetrical manner and is T-shaped in cross section can be recognized. Furthermore, a second part 2, a bracket 3, a carrying strap 5 and a spring ring 6 can be recognized. First part 1 again comprises a collar 11 for the transfer of force onto a friction reducing means, a plastic ring. A circumferential recess is provided in collar 11 for receiving plastic ring 7, into which recess plastic ring 7 is laid. The second part 2 is also designed in a rotationally symmetrical manner with the exception of two bracket receptacles 14 and is guided in a rotating manner over first part 1. Spring ring 6 is provided in order to secure the construction, which ring rests in a corresponding notch in first part 1. A bracket 3 is received in bracket receptacles 14 of second part 2. Carrying strap 5 is run through bracket 3. Furthermore, first part 1 comprises a tripod screw 4 to be screwed into a tripod thread. A rubber ring 8 is present on the foot of tripod screw 4.

The force of the camera weight is transferred via tripod screw 4 and first part 1 and its collar 11 onto plastic ring 7 and from there onto second part 2. From there it is transferred via bracket 3 onto carrying strap 5. A good ability to rotate between first part 1 and second part 2 is ensured by plastic ring 7 even under load by the force of the camera weight.

Further embodiments suitable for the particular application can be readily found by a person skilled in the art.

LIST OF REFERENCE NUMERALS 1 first part
2 second part
3 bracket
4 tripod screw
5 carrying strap
6 spring ring
7 plastic ring
8 rubber disk
9 ball
10 contact surface
11 collar
12 inner limitation of the ball bearing
13 outer limitation of the ball bearing
14 bracket receptacle

The invention claimed is:

1. A camera screw for connecting a carrying strap to a tripod thread of a camera, comprising:
    a first part and a second part, wherein the first part comprises a tripod screw on a first end and a circumferential collar on a second end, and wherein the second part surrounds the first part between the collar and the tripod screw in a rotatable manner relative to the first part about an axis of rotation, and wherein the camera screw further comprises:
    a stop connected to the first part, wherein the stop limits screwing in of the tripod screw;
    a friction reducing means provided between the second part and the collar; and wherein the second part further comprises a fastening means for the carrying strap; and
    an elastic element bordering on the stop, and wherein the elastic element is provided on a foot of the tripod screw.

2. The camera screw according to claim 1, wherein the friction reducing means is a roller bearing.

3. The camera screw according to claim 1, wherein the friction reducing means is manufactured from plastic.

4. The camera screw according to claim 2, wherein the first and the second parts form bearing boxes of the roller bearing.

5. The camera screw according to claim 2, wherein the first part and the second part form an inner ring and an outer ring of the roller bearing.

6. A camera screw for connecting a carrying strap to a tripod thread of a camera, comprising:
    a first part and a second part, wherein the first part comprises a tripod screw on a first end and a circumferential collar on a second end, and wherein the second part surrounds the first part between the collar and the tripod screw in a rotatable manner relative to the first part about an axis of rotation, and wherein the camera screw further comprises:
    a friction reducing means provided between the second part and the collar; wherein the friction reducing means is a roller bearing; and wherein the second part further comprises a fastening means for the carrying strap; and wherein the first and the second part each have a metallic contact surface for roller bodies of the roller bearing.

7. The camera screw according to claim 6, wherein the fastening means is an eyelet pivotably supported on the second part, and the axis of pivoting is aligned vertically on the axis of rotation.

8. The camera screw according to claim 6, wherein the first part includes a safety ring disposed between the tripod screw and the second part for preventing sliding of the second part in the direction of the tripod screw.

9. The camera screw according to claim 6, wherein the first part is rotationally symmetric about the axis of rotation.

10. The camera screw according to claim 6, wherein the axis of rotation coincides with the axis for screwing in the tripod screw.

11. The camera screw according to claim 6, further comprising a stop connected to the first part, wherein the stop limits screwing in of the tripod screw.

12. The camera screw according to claim 6, wherein the friction reducing means is a ball bearing.

13. The camera screw according to claim 6, wherein the roller bearing is an axial bearing.

14. The camera screw according to claim 6, wherein the first and the second parts form bearing boxes of the roller bearing.

15. The camera screw according to claim 6, wherein the first part and the second part form an inner ring and an outer ring of the roller bearing.

16. The camera screw according to claim 6, wherein the friction reducing means is manufactured from plastic.

17. The system of a camera screw in accordance with claim 6, and of a carrying strap.

18. The camera screw according to claim 6, further comprising an elastic element bordering on the stop, and wherein the elastic element is provided on a foot of the tripod screw.

19. The camera screw according to claim 7, wherein the eyelet is dimensioned in such a manner that the pivoting about the axis of pivoting is not prevented by the collar.

20. The camera screw according to claim 11, wherein the stop is formed by a safety ring that prevents sliding of the second part in the direction of the tripod screw.

21. The camera screw according to claim 13, wherein the first part forms an inner and an outer limitation of the axial bearing.

22. The camera screw according to claim 16, wherein the friction reducing means and the first part are manufactured from one piece.

23. The camera screw according to claim 16, wherein the friction reducing means and the first part are manufactured from one piece.

24. A camera screw for connecting a carrying strap to a tripod thread of a camera, comprising:
   a first part and a second part, wherein the first part comprises a tripod screw on a first end and a circumferential collar on a second end, and wherein the second part surrounds the first part between the collar and the tripod screw in a rotatable manner relative to the first part about an axis of rotation, and wherein the camera screw further comprises:
   a friction reducing means provided between the second part and the collar; wherein the friction reducing means is an axial roller bearing and the first part forms an inner and an outer limitation of the axial bearing; and wherein the second part further comprises a fastening means for the carrying strap.

25. The camera screw according to claim 24, wherein the fastening means is an eyelet pivotably supported on the second part, and the axis of pivoting is aligned vertically on the axis of rotation.

26. The camera screw according to claim 24, wherein the first part includes a safety ring disposed between the tripod screw and the second part for preventing sliding of the second part in the direction of the tripod screw.

27. The camera screw according to claim 24, wherein the first part is rotationally symmetric about the axis of rotation.

28. The camera screw according to claim 24, wherein the axis of rotation coincides with the axis for screwing in the tripod screw.

29. The camera screw according to claim 24, further comprising a stop connected to the first part, wherein the stop limits screwing in of the tripod screw.

30. The camera screw according to claim 25, wherein the eyelet is dimensioned in such a manner that the pivoting about the axis of pivoting is not prevented by the collar.

31. The camera screw according to claim 29, wherein the stop is formed by a safety ring that prevents sliding of the second part in the direction of the tripod screw.

\* \* \* \* \*